United States Patent [19]

Tiggelbeck

[11] 4,379,750

[45] Apr. 12, 1983

[54] FLUID-SOLIDS CONTACT DEVICE AND IMPROVED FLUID DISTRIBUTOR

[75] Inventor: Donald D. Tiggelbeck, Pittsburgh, Pa.

[73] Assignee: Tigg Corporation, Pittsburgh, Pa.

[21] Appl. No.: 299,641

[22] Filed: Sep. 4, 1981

[51] Int. Cl.³ .......................................... B01D 33/38
[52] U.S. Cl. .................................. 210/232; 210/289;
210/291; 55/379; 55/387; 55/413; 55/418;
261/122; 239/145
[58] Field of Search .............. 55/379, 418, 419, 413,
55/387; 210/289, 291, 345, 232, 238; 261/122;
239/145, 542, 600

[56] References Cited

U.S. PATENT DOCUMENTS

| | | | |
|---|---|---|---|
| 1,196,058 | 8/1916 | Widner | 210/289 |
| 1,580,905 | 4/1926 | Kogstrom | 55/379 |
| 2,162,043 | 6/1939 | Westlund | 55/379 |
| 2,383,946 | 9/1945 | Tietig | 261/122 |
| 3,315,895 | 4/1967 | Klingbeil | 261/122 |
| 3,603,509 | 9/1971 | Nechine | 261/122 |
| 3,713,440 | 1/1973 | Nicholes | 55/379 |
| 3,770,127 | 11/1973 | White | 210/289 |
| 4,141,128 | 2/1979 | Wonderling | 55/379 |
| 4,276,069 | 6/1981 | Miller | 55/379 |
| 4,277,341 | 7/1981 | Wise | 210/220 |

Primary Examiner—Ernest G. Therkorn
Attorney, Agent, or Firm—Harry B. Keck

[57] ABSTRACT

A fluid-solids contacting device is provided in tanks which can be essentially filled with particulate solids treating medium. An improved fluid distributor element is provided in such vessels including a tube-defining-frame such as a helix which is anchored to a fluid inlet or outlet pipe and which is covered with a fabric sleeve secured annularly to the pipe end. Where the pipe is an inlet pipe, all of the fluid must flow through the sleeve and is distributed over the area of the sleeve within the fluid-solids treating vessel. Where the pipe is an outlet pipe, the fluids leaving the tank must pass through the sleeve before entering into the outlet pipe. In both cases the flow distribution of the fluid within the tank is improved.

16 Claims, 8 Drawing Figures

FLUID-SOLIDS CONTACT DEVICE AND IMPROVED FLUID DISTRIBUTOR

BACKGROUND OF THE INVENTION

1. Field of the Invention

This invention relates to fluid-solids contact devices wherein a fluid (gas or solid) is contacted with particulate solids in a tank to effect a change in the composition of the fluid. More particularly, the invention concerns such fluid-solids contacting devices having an improved fluid distributor.

2. Statement of the Prior Art

Fluid-solids contacting devices are well known wherein a gas or liquid is contacted with particulate solids for the purpose of altering the characteristics of the gas or liquid. Typical examples for gas contacting include: cleaning exhaust airstreams by removing contaminants; cleaning storage tank vent gases; process vents; treating sewage gas vent streams; treating laboratory hood exhaust streams; treating the exhaust gases from vacuum pumps; dehydrating gaseous streams, particularly airstreams. For these gas-solids contact devices, the treatment solids may be particulate activated carbon; silica gel; activated alumina; ion exchange resins; various coalescing fibrous solids and the like.

Typical liquid-solids contacting installations include: sewage treatments; industrial waste waters; solvent streams; laboratory waste streams; separator runoff streams; scrubber wastes; plant and transportation spills; electroplating baths; recycled water; potable water; wash water. The particulate solids may be activated carbon; silica gel; activated alumina; molecular sieves; ion exchange resins; coalescing fibers.

Disposable or rechargeable devices are known wherein a tank, frequently a conventional metal drum (e.g., 55 gallons capacity) is employed as a tank for the particulate solids. The fluid (gas or liquid) is introduced and required to pass through a bed of the particulate solids for treatment. The treated fluid is recovered at the other end of the bed of particulate solids as a fluid stream. According to the prior art, such tanks employ a distributor plate in some cases to support the particulate solids bed and in other cases employ a supporting bed of inert solids such as gravel or sand to serve as a fluid distributing member to distribute the impact velocity component of the inlet fluid or withdrawn fluid.

The use of such distributor plates and supporting inert solids beds restricts the inventory of particulate solids which can be maintained in the tank. Hence such device must be replaced or recharged frequently. The recharging of such tanks is a cumbersome operation since the perforated membrane must be cleaned and reinstalled; or the inert solids must be discarded, or removed, cleaned, recovered and replaced. All of the prior art disposable or rechargeable fluids-solids contacting devices would be improved by minimizing channeling within the bed of particulate solids.

Accordingly there is a need for an improved fluid-solids contact device which has a longer operating life and hence requires fewer replacements. There is a need for a fluid-solids contact device with improved fluid flow distribution and accompanying reduction in the fluid pressure drop through the solids bed.

A fluid-solids treatment device which can be easily refilled without requiring special treatment of screens or inert solids is desirable.

STATEMENT OF THE INVENTION

According to this invention an improved fluid-solids treatment device is provided which can be assembled in any convenient tank, preferably a metal barrel. The essence of the invention is an improved fluid distributor which is fabricated from a helical wire or other tube-forming-frame which is anchored to a pipe end and is surrounded by a sleeve of fabric, preferably woven metal fabric which is secured annularly to the same pipe end. When the pipe end is an inlet pipe end, all of the fluids entering the tank through the inlet pipe end must pass through the sleeve of fabric which is positioned over the base of the tank. The incoming fluid thereby is uniformly dispersed throughout the base of the tank. This type of inlet is particularly useful where the fluid undergoing treatment is gas. In such installations the tank has an inlet as its bottom end containing the described fluid distributor. The fluid outlet is provided at the top of the tank above the solids bed. Inasmuch as the tank is completely filled with the treating solids except for the modest space taken up by the fluid distributor, the solids inventory is increased.

In another embodiment, the fluid distributor is secured to the outlet of a fluid-solids treatment device. Such installations are particularly useful when the fluid is a liquid. In such installations, a fluid inlet is provided at the top of the tank and the fluid outlet is provided at the bottom of the tank. The fluid distributor is secured to the outlet pipe. Any fluids leaving the tank must pass through the sleeve and thence into the outlet pipe.

DESCRIPTION OF THE PREFERRED EMBODIMENTS

Figure 1:
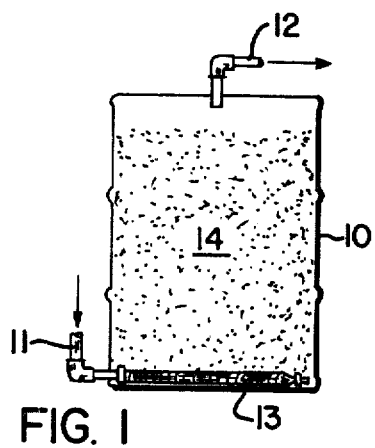
FIG. 1 is a cross-section of a fluid-solids treatment device according to one embodiment of this invention wherein the fluid inlet is provided at the base of the tank and the fluid outlet is provided at the top of the tank.

Referring to FIG. 1 there is illustrated a tank 10 which is prefereably a metal drum of 55 gallon capacity although other size metal drums may be employed. The tank 10 has a bottom inlet pipe 11 and a top outlet pipe 12. The inlet pipe 11 is connected to a fluid distributor 13. The tank 10 is otherwise filled with a bed 14 of particulate solids which are the treatment medium for the fluid which is introduced into the tank through the inlet 11. The installation illustrated in FIG. 10 is particularly useful for treating gases with solids. A gas to be treated is introduced into the inlet 11 and is distributed through the fluid distributor 13 essentially uniformly across the base of the tank 10 whence it rises upwardly through the particle bed 14. In traversing the bed 14, the gas loses its contaminants which remain behind in the particle bed 14. A cleaned gas stream is recovered through the outlet pipe 12.

Figure 2:
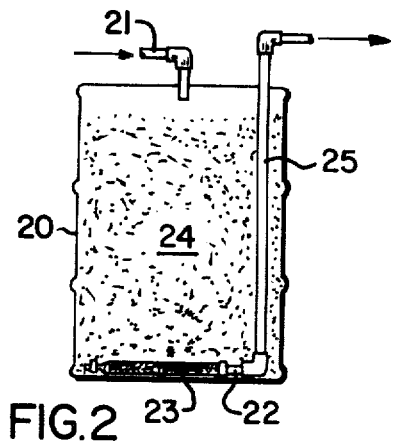
FIG. 2 is a cross-section view of an alternative embodiment of this invention wherein the fluid inlet is at the top of the tank and the fluid outlet is at the bottom of the tank.

In the alternative embodiment illustrated in FIG. 2, a tank 20 has an inlet 21 at the top of the tank and an outlet pipe 22 at the bottom of the tank. The outlet pipe 22 is connected to a distributor device 23 similar to the device 13 of FIG. 1. The remainder of the tank 20 is filled with a bed 24 of particulate solids which are the treating medium for the fluid which is introduced through the inlet 21. In this embodiment, which is particularly useful for treating liquid streams, the fluid is introduced through the inlet 21 into the tank 20 and descends through the particle bed 24 for recovery through the distributor member 23 and ultimate withdrawal from the tank through the outlet pipe 22. As illustrated in FIG. 2, the outlet pipe 22 is connected to a vertical riser pipe 25.

While the drums 10, 20 are shown in an upright position in FIGS. 1 and 2, horizontal drums also may be employed in the present fluid-solids contacting device.

In similar prior art fluid-solids contact devices, the bottom portion of the tank 10, 20 might be filled with inert particles such as gravel to provide for the distribution of fluids. The provision of a suitable base bed of inert particles reduces the inventory of active treatment solid particles in the particle bed 14, 20. In other prior art devices a foraminous support such as a screen or perforated plate is provided within the tank 10, 20 at a level above the inlet 11 (FIG. 1) or outlet 22 (FIG. 2) to establish uniform flow patterns and to retard channeling within the treatment bed. Those prior art devices similarly had a reduced inventory of active solid particles in the treatment beds. Such foraminous supports also are relatively costly.

Figure 3:
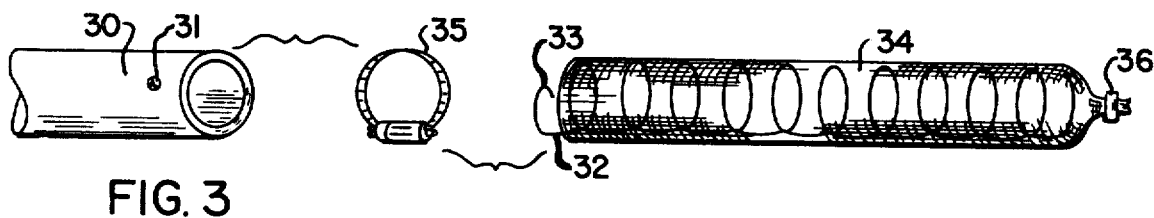
FIG. 3 is an assembly drawing showing a pipe end and the fluid distributor elements of this invention.

The fluid distributor according to this invention is assembled as shown in FIG. 3. A pipe end 30 has a small detent or hole 31. A wire helix 32 has a hook 33 at one end for engagement in the hole 31 to anchor the helix 32 with respect to the pipe end 30. A wire fabric sleeve 34 is positioned outside the wire helix 32 and engages at its open end the outer surface of the pipe end 30. An appropriate pipe clamp 35 is applied over the open end of the sleeve 34 to clamp the sleeve to the outer surface of the pipe end 30. The other end of the sleeve 34 is closed. Preferably the wire fabric is folded and the folds are fastened with some form of a fastener, preferably a penetrating fastener such as a rivet 36, stitches, staples and the like. The wire helix 32 has a diameter which corresponds to the outer diameter of the pipe end 30. The wire helix 32 functions as a tube-defining-frame to support the tubular shape of the fabric sleeve 34. Any fluids entering into the inlet pipe 30 will fill the sleeve 34 and pass out through the openings in the fabric which forms the sleeve 34.

The term "fabric" as employed herein comprehends woven wires, filaments and threads and also comprehends welded cloth and adherent filament or adherent wire cloth as well as extruded plastic mesh, such as Nylon mesh.

As an alternative tube-defining-frame, a group of wire rings or arcuate wires may be secured at spaced locations along longitudinal stringers.

While the sleeve 34 is illustrated as being closed at one end, it is also contemplated that the sleeve might be open at both ends and connected at each open end to a pair of pipe ends which are connected to a common source.

Preferably the helix 32 is formed from stiff metal wire although stiff plastic wire has been employed with some success. The wire fabric forming the sleeve 34 prefera- bly is formed from metal wires such as stainless steel wires. Plastic fabrics also may be employed.

Figure 4:
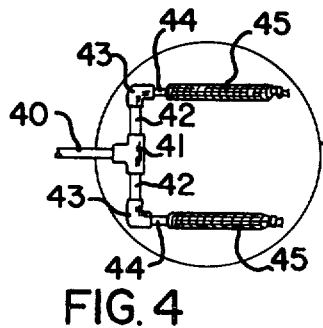
FIGS. 4, 5, 6, 7 are alternative plan views of typical fluid distributors in accordance with this invention.

As shown in FIG. 4, an inlet pipe 40 connects to a tee 41 having two pipes 42, two elbows 43 and two pipe ends 44, each of which receives one of the present distributors 45 which provide uniform dispersion across the base of a tank 46.

Figure 5:
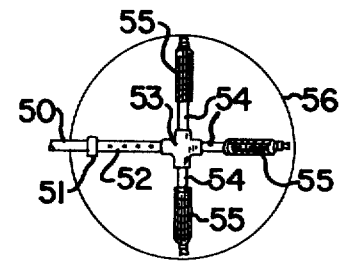

In FIG. 5, an inlet pipe 50 has a coupling 51 connected to a pipe 52 which in turn is connected to a cross 53. Each of the open three arms of the cross 53 is connected to a pipe end 54 and in turn to a distributor 55. The three distributors and the perforated tube 52 supply uniform distribution of a fluid in a tank 56. The pipe 52 may be perforated, if additional fluid distribution is desired. The pipe 52 may be replaced by a two-ended fluid distributor. The cross 53 thus may be joined to the pipe 50 by such two-ended fluid distributor which is similar to the distributors 55, except that the two-ended fluid distributor will deliver fluid between the pipe 50 and the cross 53.

Figure 6:
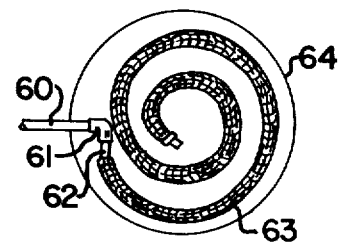

In FIG. 6 an inlet pipe 60 is connected through a coupling 61 to a pipe end 62 which in turn is connected to a fluid distributor 63 which is spiraled about the base of a tank 64. The tube-forming-frame within the distributor 63 retains the desired shape of the fluid distributor and provides for uniform distribution over the base of the tank 64.

Figure 7:
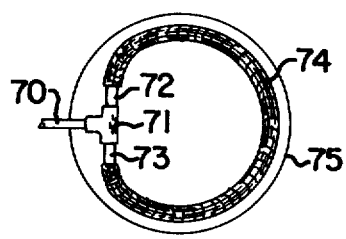

In FIG. 7 an inlet pipe 70 is connected to a tee 71 having pipe ends 72, 73 serving as communicating pipe branches. A fluid distributor 74, open at both ends, is connected at one end to the pipe end 72 and at the other end to the pipe end 73. In this embodiment fluid from the inlet 70 is delivered through the pipe end 72, 73 directly into the closed ring-like distributor 74 for uniform distribution of fluid throughout the base of a tank 75.

Figure 8:
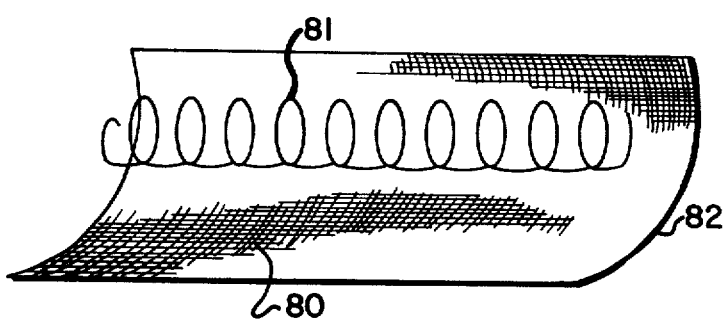
FIG. 8 is an assembly view showing one process for assembling the fluid distributor of this invention.

As shown in FIG. 8, the present fluid distributor can be assembled by wrappinig a rectangle 80 of woven wire fabric about a preformed helix 81. The free end of the wrapped sleeve can be secured by stitching with wire or threads. The open end remains available to engage the outer surface of a pipe end. The closed end 82 is folded and fastened with a penetrating fastener (not shown in FIG. 8) of the type illustrated in FIG. 3.

Performance

The use of the present fluid distributors has brought about a surprising improvement in the performance of disposable or rechargeable fluid-solids contacting devices. A significantly lower pressure drop for the fluid has been observed. Improved gas distribution has been observed within the bed of solids. The active life of the solids bed inventory has been increased. The units are easily emptied and refilled when required. There is an overall reduction in the treatment cost for the fluid which employs the present invention.

Best Mode

A 55-gallon steel drum was fitted with a bottom inlet pipe, two-inch diameter, extending through the cylindrical sidewall of the drum and an outlet pipe, two-inch diameter, extending through the center of the flat drum lid. A fluid distributor secured to the bottom inlet pipe end had a metal wire helix, approximately two-inches diameter, and twenty inches long. The helix was wrapped with 30-mesh stainless steel fabric formed from 0.012 inch diameter wire. The free end of the fabric was stitched with stainless steel wire to complete the sleeve. The open end of the sleeve was secured to the inlet pipe end by an encircling pipe clamp. The closed end of the sleeve was sealed by folding and fastening a metal rivet through the folds.

The drum was filled with activated carbon particles to within 2–3 inches of the top. The carbon particles were screened through 4-mesh, on 10-mesh (U.S. Sieve).

The resulting device was capable of treating gas flows up to about 100 cubic feet per minute at a pressure drop of about 6.5 inches of water.

A device, as described, was installed to treat the exhaust stream from a sewage sludge collector vacuum pump. The principal contaminant of the gas stream was hydrogen sulfide. At flow rates of about 100 cubic feet per minute, the device was capable of reducing the hydrogen sulfide from a non-acceptable level in the inlet gas to an acceptable level in the outlet gas for periods exceeding six months without replacement.

I claim:

1. In a fluid-solids contact device comprising a tank containing particulate solids, a fluid inlet at the bottom of said tank and a fluid outlet at the top of said tank, the improvement comprising a fluid distributor device in the bottom of the said tank secured to the said inlet and comprising a tube-defining helix wire frame, secured at one end to said inlet, and a fabric sleeve surrounding and supported by the said tube-defining-frame whereby fluids entering the said tank pass from the said inlet through the fabric openings in the said sleeve.

2. The improvement of claim 1 wherein the said tube-defining-frame is a helical wire.

3. The improvement of claim 1 wherein the said fabric is woven metal wire.

4. The improvement of claim 3 wherein the said woven metal wire is stainless steel wire.

5. The improvement of claim 1 wherein the said fabric sleeve rests upon a bottom well of the said tank.

6. In a fluid-solids contact device comprising a tank containing particulate solids, a fluid inlet at the top of said tank and a fluid outlet at the bottom of said tank, the improvement comprising a fluid distributor device in the bottom of the said tank secured to said outlet and comprising a tube-defining helix wire frame, secured at one end to said outlet and a fabric sleeve surrounding and supported by the said tube-defining-frame whereby fluids from said tank pass through the fabric openings in the said sleeve before entering the said outlet.

7. The improvement of claim 6 wherein the said tube-defining-frame is a helical wire.

8. The improvement of claim 6 wherein the said fabric is a woven metal wire.

9. The improvement of claim 8 wherein the said woven metal wire is stainless wire.

10. The improvement of claim 6 wherein the said fabric sleeve rests upon a bottom well of the said tank.

11. A fluid distributor for a pipe end in a fluids-solids contact device comprising a wire frame consisting of a helix, a fabric sleeve surrounding and supported by the said frame; a wire-receiving opening through the wall of a pipe end; one end of said sleeve annularly engaging said pipe end; the corresponding end of said helical wire extending through the said opening in the said pipe end; fastening means for securing said one end of said sleeve to said pipe end and also for retaining the said corresponding end of said wire frame in the said opening; the other end of the said sleeve being a closed end.

12. The fluid distributor of claim 11 wherein the said closed end is formed by folding the end of said fabric and securing the folded end with a fastener.

13. The fluid distributor of claim 11 wherein the said fabric is wrapped around the said tube-defining-frame and is secured as a sleeve by stitching the fabric with a wire or thread.

14. A fluid distributor comprising a pipe having multiple branches, each branch having a pipe end and each said pipe end having a fluid distributor as defined in claim 11.

15. A fluid distributor for a fluids-solids contact device comprising a pipe having two communicating branches, each having a pipe end, a helical wire frame anchored at one end to one of said pipe ends and anchored at the other end to the other of said pipe ends; a fabric sleeve surrounding and supported by the said helical wire frame; one end of said sleeve being engaged with and secured to one of said pipe ends and the other end of said sleeve being engaged with and secured to the other one of said pipe ends.

16. A fluid distributor according to claim 11 or 15 wherein the said fabric is stainless steel fabric from 20 mesh size to 40 mesh size having from 30 to 80 percent open area.

* * * * *